US005115157A

United States Patent [19]

Blumenau

[11] Patent Number: 5,115,157

[45] Date of Patent: May 19, 1992

[54] LIQUID SEALED VANE OSCILLATORS

[75] Inventor: Leif Blumenau, Beer Sheva, Israel

[73] Assignee: Technion Research & Development Foundation, Ltd., Haifa, Israel

[21] Appl. No.: 451,520

[22] Filed: Dec. 15, 1989

[30] Foreign Application Priority Data

Dec. 21, 1988 [IL] Israel ........................................ 88759

[51] Int. Cl.[5] .......................... H02K 44/00; F25B 9/00

[52] U.S. Cl. ........................................... 310/11; 62/6; 417/417

[58] Field of Search .............................. 310/11, 22–24, 310/32, 34, 35; 62/6; 417/417, 418, 419

[56] References Cited

U.S. PATENT DOCUMENTS 2,359,819 10/1944 Bachrach ............................ 417/481
3,460,344 8/1969 Johnson ................................ 60/519
3,822,388 7/1974 Martini et al. ...................... 310/300
4,050,851 9/1977 Haavick ................................ 417/68
4,500,265 2/1985 Evans et al. ........................ 417/417

FOREIGN PATENT DOCUMENTS 1180437 6/1959 France .

*Primary Examiner*—Steven L. Stephan
*Assistant Examiner*—Judson H. Jones
*Attorney, Agent, or Firm*—Michael N. Meller

[57] ABSTRACT

A displacement or power mechanical oscillator comprises an oscillation space constituted by a sector of an annular cavity, having a rectangular cross-section in a plane through the axis of the cavity and vertically oriented plane of symmetry. The cavity contains a sealing liquid and a vane in closed matching relationship with the inner walls of the cavity. The vane is symmetrically oscillatable with the liquid in the narrow gaps between vane and cavity walls providing a liquid dynamic seal.

22 Claims, 10 Drawing Sheets

LIQUID SEALED VANE OSCILLATORS

FIELD OF THE INVENTION

The present invention relates to vane oscillators. More particularly the invention relates to a method for dynamically sealing vane oscillators, and to internally sealed vane oscillators obtained thereby. The invention further relates to a method for magnetic coupling of said oscillators and to particular applications of the said dynamically sealed and magnetically coupled vane oscillators.

BACKGROUND OF THE INVENTION

Reciprocating pistons (oscillators) are used in a great variety of fluid flow machinery, and are well known in the art. Two types of oscillators are employed, namely, "zero net fluid flow", in which there is no throughflow of fluid and the fluid, on which the oscillator acts, only undergoes pressure fluctuations as it interacts with the oscillatory member, and the "net fluid flow", in which fluid flows through the oscillator by means of induction and delivery valves and undergoes either fluid compression/pumping action, or fluid expansion.

Two types of pressure fluid oscillators are employed in each case, and the present invention is directed to both these types. They are the "displacement oscillators", which serve only as recoil or bouncing oscillators driven by a pulsating fluid pressure, and "power oscillators", which convert power from pulsating fluid pressure to mechanical or electric power, or vice versa, via the oscillatory member.

THE PRIOR ART

Prior art oscillators comprise mechanically linked/guided pistons, e.g., with crank-shaft, rhombic drives, etc., or free pistons, without mechanical linkage, coupled via gas springs or having hydraulic or magnetic couplings via electromagnetic induction. There are also vane oscillators with the vane shafted to the outside. Practically all the prior art oscillators are internally sealed by either mechanical or gas dynamic seals, which present several serious drawbacks. The mechanical linkage power oscillators of the art cannot be hermetically closed out, which renders the containment of low atomic weight gases, e.g. helium, difficult and may be dangerous when having to contain radioactive, toxic or flammable gases, especially those having low atomic weight.

SUMMARY OF THE INVENTION

It has now been found, and this is an object of the present invention, that it is possible to provide substantially hermetically closed out, dynamically, liquid sealed, displacement and power oscillators, which overcome the aforesaid drawbacks and which provide many additional advantages. One of such additional advantages, which comes into play when the invention is applied to free piston power oscillators, is that power is transferred by the method of electromagnetic conduction, which can be made more effective than electromagnetic induction and should lead to higher power density. This will be better understood from the following considerations.

An electromagnetic "conduction machine" is one where a steady magnetic field of strength B is externally applied by means of solenoidal field winding, permanent magnet, etc., and current is conducted through the device by means of a set of electrodes. These machines are often referred to as DC Faraday devices. Examples of these are Homopolar machines (often called Faraday wheels (disks)) and DC Faraday MHD channels where the moving conductor is liquid metal.

In an "induction machine" both the magnetic field and current are induced into the moving conductor as mutually perpendicular travelling waves by means of complicated field windings arranged in the form of bundles and, in some cases, by making use of electric oscillator bridges. Examples of induction devices are asynchronous motors/generators and linear MAG jacks. In both cases, a ponderomotive force ($J \times B$) $N/m^3$ acts or reacts on the moving conductor.

Generally speaking, inductive devices are not as efficient as conductive devices because of spurious eddy current production and difficulty in avoiding end losses. The mechanics of the travelling wave field windings is such as to render them space consuming and due to structural difficulties the magnetic field must be low ($\sim$0.5T). There are normally end losses also in linear conductive devices, but not in the devices according to the invention, since in those, as will appear later, the conductive vane finishes abruptly. Thus, the efficiency approaches the theoretical maximum equal to the load factor for generators and inverse of load factor for motors. The load factor K can be made close to one still obtaining reasonable power density ($K=1$ gives no power exchange). The homopolar device theory applies in toto to this device, if bearing in mind that the angular velocity $\omega = d\phi/dt$ is here not steady but a harmonic function. This constitutes one novelty, since alternating current is produced or accepted with the present oscillating Faraday wheel (read vane), whereas with steady conductor motion a direct current is produced or accepted (from this DC Faraday device), as in the homopolar machine. As far as is known to the applicant, an AC conductive Faraday device has not been disclosed prior to this invention. The conductive device has a high power density since the winding configuration e.g. solenoid is compact and can readily be made to produce high magnetic fields, e.g. up to 2T if an iron yoke is used, and otherwise up to 15T with superconducting windings in air gap magnets.

It has further been found, and this is another object of the invention, that the oscillators of the invention can be adapted for internal direct contact, liquid to gas, heat exchange, using the sealing liquid itself or other employed buffer liquid, rendering associated gas compression/expansion processes nearly isothermal. This can be fully exploited in Carnot-like thermodynamic cycle devices, e.g. those based on Stirling and Ericsson cycles, which by definition employ isothermal compression/expansion processes. Novel configurations for Ericsson and Stirling cycle devices, using the oscillators of the invention, also form a part of this invention.

DETAILED DESCRIPTION OF THE INVENTION

The oscillator according to the invention is characterized in that it comprises an oscillation space, defined by a vessel, which contains a sealing liquid, and a vane oscillatable within said space and having a surface in closely matching relationship with the inner wall of said vessel, the said vane surface being provided with serrations whereby to generate a hydrodynamic liquid seal in the gaps between said vane and said inner wall of said vessel.

Still more preferably, the serrations of the vane surface should be such as to be effective in both directions. A desirable form of serrations is that of bi-directional scoops.

In a particularly advantageous form of the invention, the said liquid seal is enhanced by employing, as the liquid housed in said vessel, an electrically conductive liquid, and applying a magnetic field across the liquid in the gaps between the vane and the inner wall of the vessel, whereby the said sealing liquid is made to adhere to the moving vane by Magneto Liquid Dynamic effect. Preferred electrically conductive sealing liquids comprise liquid metals or alloys thereof, e.g. Hg, Ga, NaK, GaInSn etc. The MLD (Magneto Liquid Dynamic) effect referred to above is known in the art as "Hartmann flow in narrow gaps". A mathematical theory thereof is developed in a paper by Xu, J. J. and Woo, J. T., "Asymptotic Solutions of Steady Magneto-Fluid-Dynamic Motion between two Rotating Discs with a small Gap", Phys. Fluids 30 (12), Dec. 1987. However it has never been exploited to provide liquid seals of the type herein described and claimed.

The MLD effect grows stronger with increasing Hartman Number, which number is defined as $$Ha = Bw\,(\sigma/\mu)^{178} \qquad (1)$$

where:

B = magnetic field strength across liquid gap
w = width of liquid gap
$\sigma$ = liquid electric conductivity
$\mu$ = liquid viscosity To produce the MLD sealing effect, the sealing liquid must, as has been said, be electrically conductive. However the pressure fluid, viz. the fluid that undergoes pressure fluctuations in zero net fluid flow oscillators or flows through net fluid flow oscillators, should be dielectric, and may be a gas or a liquid or a combination of both, as will hereinafter be explained. Further to this, the inside surfaces of the oscillation space wetted by the electrodynamic liquid should be electrically insulated.

In another preferred form of the invention, the oscillator space is constituted by an annular cavity, having a rectangular cross-section in a plane passing through the horizontal axis of the cavity.

In a further preferred form, the vane is fully submerged into the electrodynamic sealing liquid, but this latter preferably barely covers its uppermost surface.

In a still further preferred form, the surface of the vane that is in matching relationship with the inner vessel surface has a clearance from this last surface in the order of one millimeter, and preferably has like clearances from the surfaces which axially bound the oscillator space, viz. the side walls of the vessel.

Still more preferably the vane has a weight that is less than the thrust exerted on it by the sealing liquid, so that it has a positive buoyancy. Then preferably, the vane should satisfy the conditions for static rotational equilibrium, which will be detailed hereinafter. To this end, where used as a displacement oscillator, it is desirable, though not necessary, that the vane be hollow.

Preferably, the double acting vane oscillators are provided with ports in their pressure chambers—viz. in the spaces above the vane on the oscillator's two sides, occupied by the pressure fluid—for communicating with the outside. The ports may be simple, as for the case of the zero net fluid flow application, or equipped with a set of induction and delivery valves, as for the case of net fluid flow applications. One pressure chamber may also be blocked to provide a so called bouncing space.

Still more preferably, the vane is provided with positive suspension means, i.e., being tied to a central axis. In this case the vane may be heavier than the liquid it displaces and, naturally, display static rotational equilibrium.

According to another aspect of the invention, means are provided for carrying out essentially isothermal expansion and /or compression processes. For this purpose, an oscillator is provided with means for transferring buffer or sealing liquid from the oscillator cavity to the respective pressure chambers via a heat exchanger, and preferably via spray nozzles or other suitable means for atomizing said liquid within the chamber to which it is transferred and momentarily creating an intimate mixture of said liquid with the pressure fluid handled by the oscillator.

According to another aspect of the invention, thermodynamic Stirling cycle devices are provided, including means for heating/cooling of the thermodynamic fluid via the aforementioned method for direct contact heat-exchange. The devices are arranged according to the quintessential Stirling device alpha-configuration, or variations thereof. Piston (read vane) drives are by means of free-piston or kinematic methods, according to cases, in that the simple alpha-configuration may not be conducive to free oscillations in engine operation with the free-piston drive method.

The invention introduces a double-acting free-piston refrigerator/heat-pump of simple alpha-configuration which is characterized by it making full use of the thermodynamic room constituted by all of the pressure chambers associated with the double-acting power and displacement oscillators.

According to still another aspect of the invention, a free piston, thermodynamic Stirling cycle device is provided, which is characterized in that it has a double-alpha configuration and preferably comprises oscillators according to the invention. The double-alpha configuration, hereinafter fully described, is new and original in itself. More specifically, the said configuration, according to the invention, is characterised in that it comprises a power oscillator, the two pressure chambers of which are connected via bidirectional regenerators, to a pressure chamber of two displacement oscillators, the other pressure chambers each of which are closed and become therefore bouncing chambers. This configuration can operate as an engine, or a thermally driven refrigerator, or, alternatively, in combination modes.

Whereas expansion/compression processes associated with each oscillator become nearly isothermal with direct contact heat-exchange the temperature differential in heat-exchange can, all the same, be made relatively large, and, thus, pumping power kept within bounds, by letting the heat-transfer fluid traverse two or more oscillators in series. For this reason, there is introduced a free-piston double-acting double-alpha configuration linking four oscillators via regenerators in a closed ring. This avoids bouncing spaces associated with the aforementioned double-alpha configuration. Thus, there is made full use of the thermodynamic room. This configuration is useful for both thermally driven free oscillation engines and refrigerators.

According to yet another aspect of the invention, a free piston Ericsson cycle refrigerator/heat pump is provided, to overcome the theoretical difficulty with high performance Stirling cycle refrigerators/heat pumps. Said device comprises a displacement and a power oscillator in essentially an alpha-configuration, said oscillators being net fluid flow devices, one pressure chamber of the power oscillator being a bouncing space and the other pressure chamber thereof being connected via a regenerative heat exchanger to one pressure chamber of the displacement oscillator, the other chamber thereof being a bouncing space.

The above and other characteristics and advantages of the invention will be better understood through the following illustrative and non-limitative description of preferred embodiments, with reference to the appended drawings, wherein.

Figure 1:
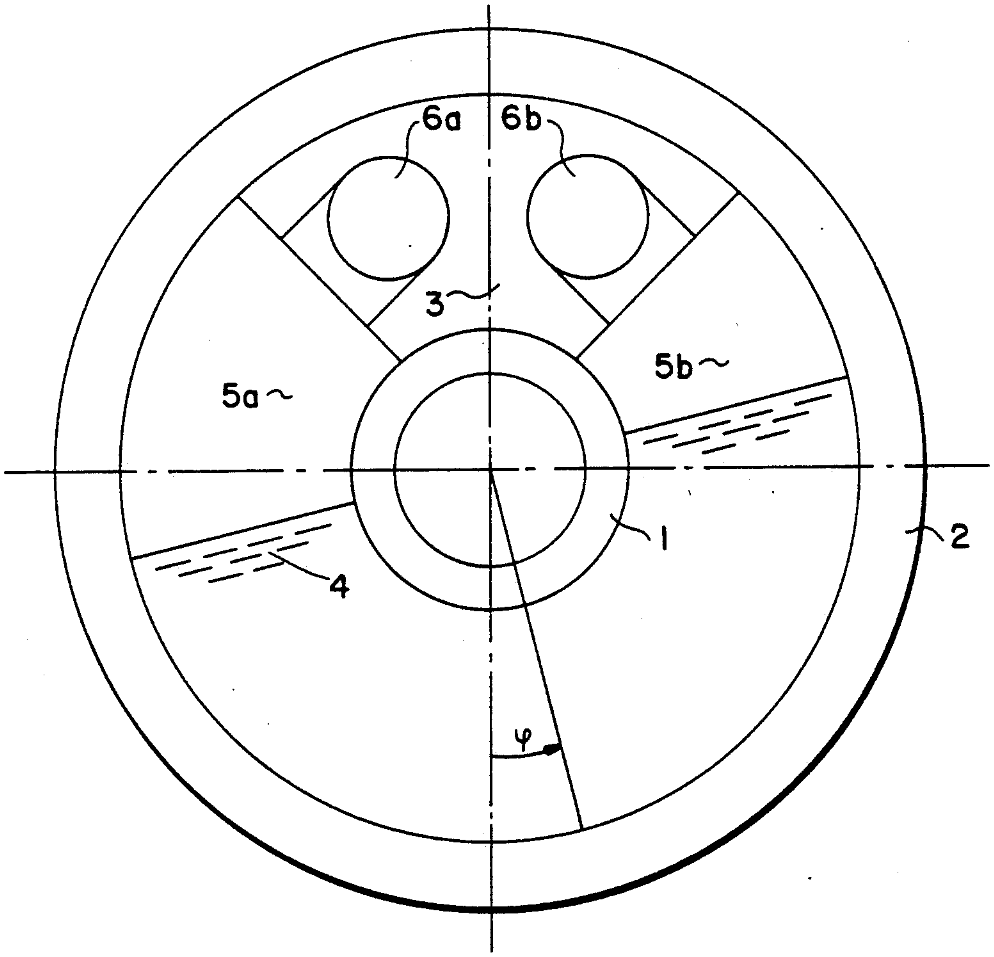
FIG. 1 is a schematic representation of a basic liquid oscillator.

With reference now to FIG. 1, the oscillator is basically one derived from a simple U-tube liquid oscillator, in which an oscillatory liquid column is confined in a U-shaped vessel, the twin vertical legs of which are open to the atmosphere. The natural frequency of such a U-tube liquid oscillator is gravity dependent and increases with the inverse square root of the length of the liquid column. If the legs of the U-tube are closed off from the atmosphere, the resulting gas springs in the legs of the U-tube will give rise to restoring forces. If such restoring forces dominate over the gravity restoring forces, the natural frequency is nearly proportional to the square root of the ratio of the charging pressure to the length of liquid column. In order to achieve frequencies of the order of 50–60 Hz with a minimum charging pressure, the length or total mass of the liquid column must be made as small as possible. This occurs when substantially only the "curved portion" of the U-tube is retained.

Such a situation is shown in FIG. 1, in which the "U-tube" has been transformed into an annular cavity, having a rectangular cross-section in an axial plane, viz. in a plane perpedicular to the plane of the drawing and passing through the center of the annular cavity. The cavity is bounded internally by hub 1 and externally by a cylindrical shell 2, and is filled with a sealing liquid indicated at 4. A dividing barrier 3 is provided on top of the oscillator, thus creating two chambers 5*a* and 5*b* above the liquid. The said chambers 5*a* and 5*b* are filled with pressure fluid having a density lower than that of the liquid 4, so that it remains within the upper chambers and does not substantially mix with the liquid 4. The pressure fluid may further communicate with an outside pressure volume via the port openings 6*a* and 6*b*. The liquid is shown in the drawing in a moment in which it is displaced by an angle $\phi$ from its equilibrium static position.

Figure 2:
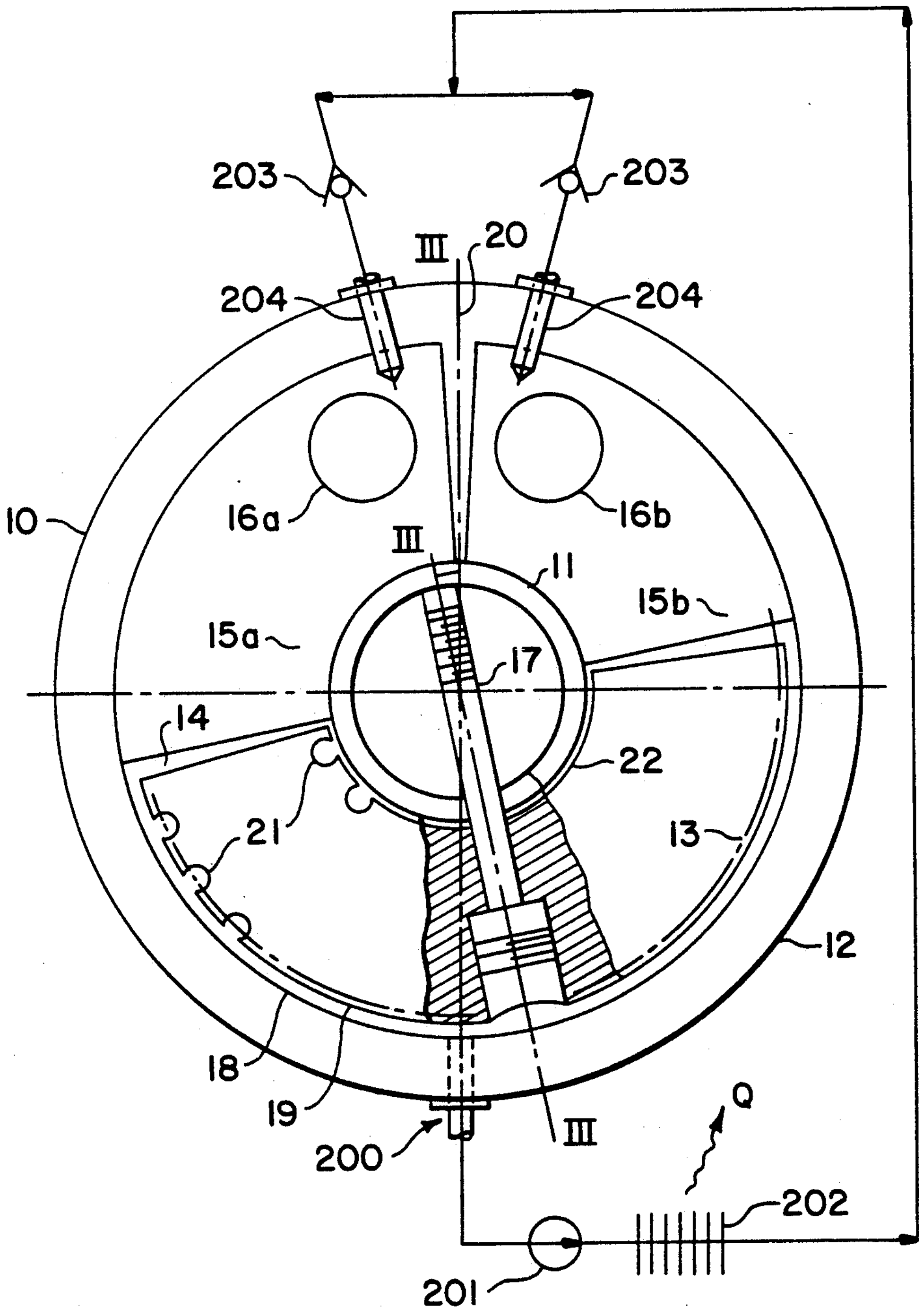
FIG. 2 is a schematic representation, in transverse cross-section, of an oscillator according to an embodiment of the invention.

With reference now to FIG. 2, the oscillator shown in the figure comprises a cylindrical vessel 10, defined on the inside by a cylindrical shell 11, wherein is housed a vane 13, submerged into a sealing liquid 14. The purpose of the vane is to avoid breaking-up of the liquid column 14 during oscillation, which is required for a proper functioning of the device. The vane 13 almost completely fills the annular cavity comprised between an inner hub 11 and the outer shell 12 and is completely submerged in the liquid 14, although, in the embodiment described, said liquid barely covers the uppermost surface of the vane 13. Only small clearances, in the order of 1 mm, are left between the outer, substantially semi-cylindrical surface 19 of the vane and the portion of the cylindrical inner surface 18 of the oscillator shell, with which it is in facing, matching relationship during the oscillation of the vane. In the particular embodiment herein described, the vane is positively suspended, e.g. by means of a rotatable barrel axis inserted in inner hub 11 and connected to the vane by means of bolt 17. The said suspension practically eliminates rocking and permits the use of a vane heavier then the thrust it receives from the liquid 14. However it is not an essential element of the oscillator of the invention. Two chambers 15*a* and 15*b* are formed within the vessel 10, are occupied by the pressure fluid, and communicate with the outside via the ports 16*a* and 16*b*. 20 is a diaphragm which separates the said two chambers.

In dynamic operation, although viscous forces will cause the liquid 14 to follow the vane 13, a finite slip between the liquid and the vane would, generally speaking, exist. It is, however, recognized the existence of special dynamic conditions at which the sealing liquid adheres to the oscillator vane surface, as well as the stationary surfaces, the so-called slosh-free state. This can be derived analytically from the equation of motion pertaining to the liquid in the clearance spaces. Assuming viscous flow and negligible inertial effects, by way of example, the primary equation for the outer perimeter gap can be written:

$$(\mu/\rho)(\partial^2 u/\partial y^2)-(\partial u/\partial t)=(\Delta Po/r_o\Delta\alpha\rho P_R)\cos(\nu t+\beta) \quad (2)$$

where u=velocity as a function of gap coordinate y; $0<=y<=w$ $\Delta P_o$=differential pressure amplitude across vane $r_o$=vane outer radius $\Delta\alpha$=vane angle $\beta$=arbitrary phase angle for pressure variation $\upsilon$=circular frequency of pressure variation and vane motion For the slosh-free state the following boundary conditions must be satisfied:

$$u(y=w)=0 \quad (3.A)$$

$$u(y=0)=-u_o \sin(\upsilon t+\alpha) \quad (3.B)$$

where:

w=gap width at outer radius (note, w<<r)

$\alpha$=arbitrary phase angle for vane motion $u_o$=velocity amplitude at outer radius Above $P_R$ is a liquid-to-vane coupling factor. The larger the value for $P_R$ the higher is the allowed pressure differential $\Delta P_o$. In order to better couple the liquid to the outer surfaces of the vane 13, serrations are provided in the surface 19 of the vane, which moves in adjacent, matching relationship to the inner surface 18 of the oscillator vessel 10. The most desirable form of serration is one that scoops the liquid and is bi-directional, i.e. effective in both directions. A series of holes, as shown at 21, can be drilled or milled along the surface 19, to act as such bi-directional scoops: however other forms and types of serrations can de adopted to effect a hydrodynamic seal, as will be apparent to persons skilled in the art. Further, like serrations 21 are preferably provided in the inner, substantially semi-cylindrical surface 22 of the vane 13, which moves in adjacent, matching relationship to the outer surface of hub 11.

The liquid seal can be further improved by an application of the Magneto Liquid Dynamic sealing effect. This is achieved by applying a steady magnetic field in the axial direction across the lateral liquid gaps. This results in the suppression of secondary liquid circulations in the lateral gaps with both radial and axial components, as a result of the MLD effect.

To utilize the MLD effect, as will be apparent to a person skilled in the art, the sealing liquid 14 must be electrically conductive, e.g., a liquid metal such as Hg, Ga, etc., or an alloy, such as NaK, GaInSn, or the like, while the pressure fluid must be dielectric. Furthermore, the inside surfaces of the oscillator vessel, which are wetted by the liquid, must be electrically insulated, e.g., by a suitable dielectric coating, or belong to bodies made of dielectric material. The formula for the Hartman Number Ha, given above, permits to calculate the required magnetic field strength in each particular case, e.g., since a sufficient value of Ha is 10 (according to previously referenced paper by Xu, J. J. and Woo, J. T.), if the liquid metal is Hg and $w=0.5\times10^{-3}$ m $-$B will be 0.769 T.

The pressure fluid may be any suitable gas or liquid, which is not electrically conductive. Examples of suitable pressure fluids are air, oil, helium, nitrogen and kerosene.

Figure 3:
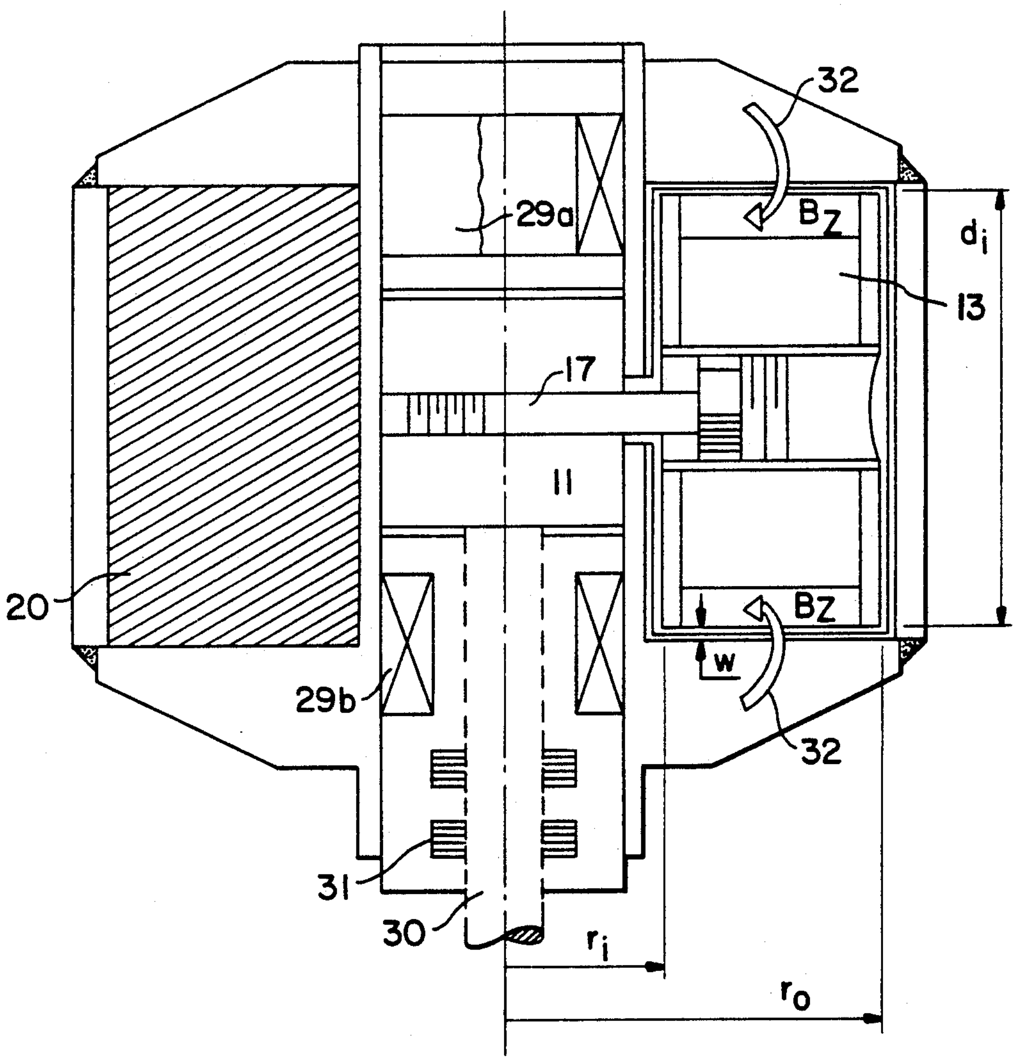
FIG. 3 is a schematic representation, in cross-section along the line III—III—III of FIG. 2, of an oscillator according to another embodiment of the invention.

FIG. 3 shows a mechanical power oscillator with a shaft, in cross-section along the axial plane of the diaphragm 20 and the axial plane passing through the axis of bolt 17, as indicated at III—III—III in FIG. 2. The same structure shown in the figure would provide a displacement oscillator if the shaft were omitted. Therefore the shaft 30 is shown in broken lines in the drawing. Since the vane 13 is rigidly connected to a hub 11 via the bolt 17, and said hub is solid with or rigidly connected to the shaft 30, which extends to the outside of the oscillator, the vane and shaft motions coincide. Oscillating mechanical shaft power can, thus, be supplied from the outside, e.g., via a Grashof chain, a 4-bar linkage transfering harmonically varying rocking motion to constant speed rotation or vice versa, causing an internal pulsating pressure. Alternatively, given that an internal pulsating pressure has been created via communicating port openings, not shown, such as 16*a* and 16*b* of FIG. 2, power can be supplied by the oscillator through the oscillating mechanical shaft 30. The mechanical power oscillator illustrated in FIG. 3 suffers from the necessity to provide a shaft penetration through the pressure boundary provided by a seal, such as packing 31. As configured the vane oscillator with shaft penetration does provide hermetic close-out of the space containing the thermodynamic fluid since this is locked in above the liquid surface which cannot be displaced. The liquid itself may, of course, be subject to leakage throughout the packing 31.

A magnetic field may be applied to provide enhanced internal liquid seal by MLD, as schematically indicated in the drawing by arrows 32. As noted above, B may be about 0.7 T. Using ferro-magnetic materials, non-ferromagnetic gaps are small, e.g. a few mm. Thus, only very few Ampere turns in the solenoidal magnetic field windings 29*a* and 29*b* are required to produce the needed field.

As stated hereinbefore, when use is made of a magnetic field, the sealing liquid should be conductive and the pressure fluid be dielectric. It should now be pointed out that said dielectric pressure fluid may be liquid or gas, or a combination of both. In this latter case a dielectric liquid may be sandwiched between the conductive sealing liquid, e.g. liquid metal, which will be below it, and a gas, which will be above it. It is also entirely possible that a dielectric liquid fills one pressure chamber and a dielectric gas the other pressure chamber. It is naturally required that the respective fluids interfacing with each other and with surrounding portions of the oscillator vessel, be mutually inert, i.e., do not chemically react with each other nor dissolve into each other by diffusion across mutual boundaries. Therein lies one of the reasons for employing an intermediate dielectric liquid as a buffer between the sealing liquid and a pressure gas. It can serve as a barrier between the gas and the liquid, should these tend to react with one another. In addition, the buffer liquid can be utilized to modify the oscillator dynamics and, most importantly, for direct contact heat exchange with the pressure gas. The pressure fluid should have a lower density than the sealing liquid metal and the buffer liquid, if this latter is employed. Some possible fluid combinations are suggested in Table 1.

Most commonly, mechanical shaft power is either transferred to an electric generator or provided from an electric motor. The basic displacement oscillator according to the invention can be transformed into an electric power oscillator by introducing a few changes as follows.

TABLE 1

| WORKING FLUID COMBINATIONS | | | | | |
|---|---|---|---|---|---|
| | Ex. 1 | Ex. 2 | Ex. 3 | Ex. 4 | Ex. 5 |
| Pressure Fluid | Air | Oil | Helium | Nitrogen | Kerosene |
| Buffer Liquid | Water | — | — | — | — |
| Electro-dynamic Liquid | Mercury | Gallium | NaK | NaK | NaK |

Figure 4:
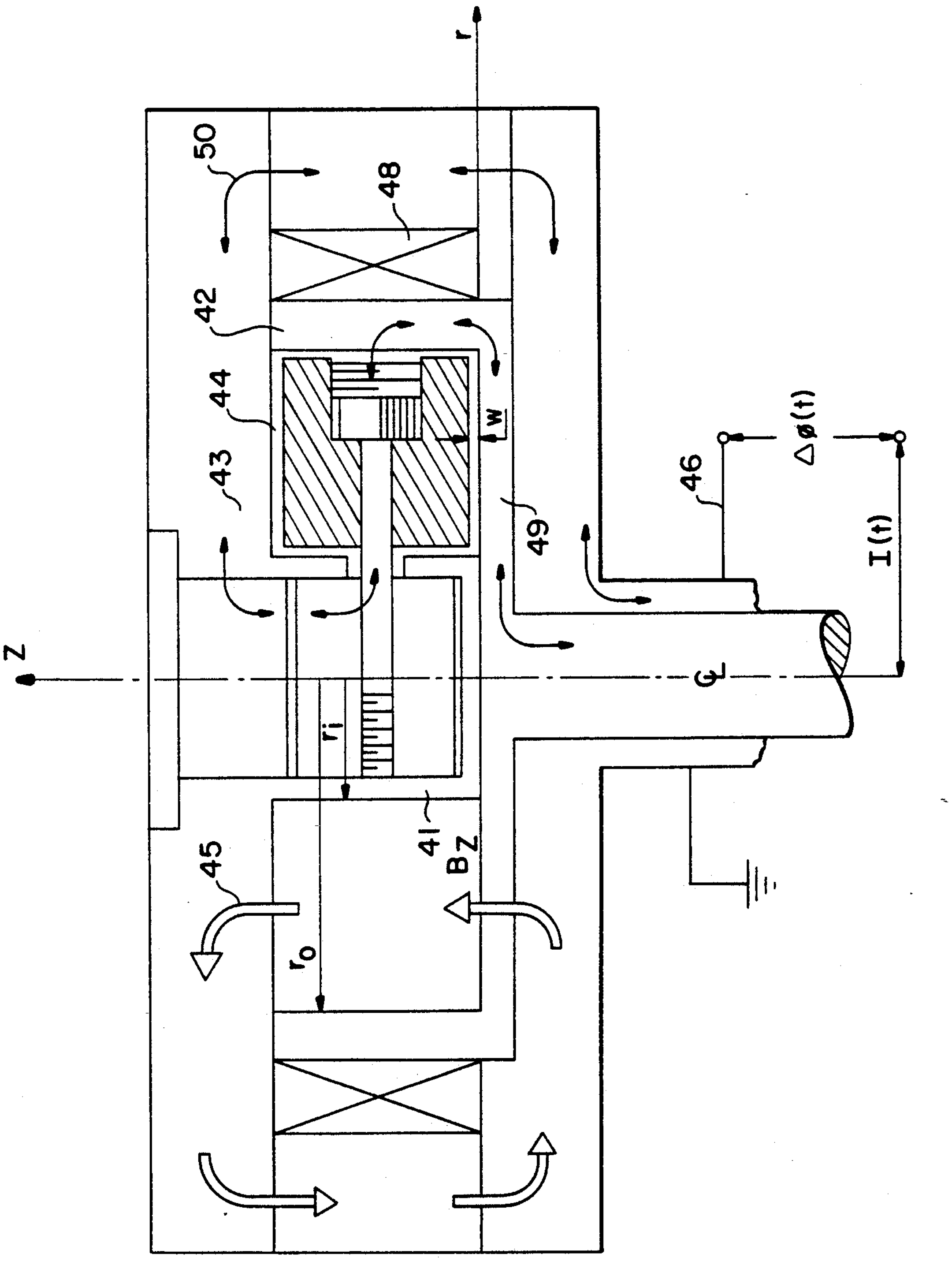
FIG. 4 is a schematic illustration, in axial cross-section, of a vane power oscillator, according to an embodiment of the invention, used as an electric power oscillator.

Referring to FIG. 4, this illustrates the use of an oscillator according to the invention as an electric power oscillator. The inner hub 41 and the outer shell 42 of the oscillator vessel are made to function as electrodes. They are connected via the internal armature and external electric circuit 46 to an electric load, or an alternating current source, as the case may be. An axial magnetic field, e.g. as indicated by the arrows 45, is provided over the entire section of the vane 43, and not only in the lateral liquid gaps as in the displacement oscillator. The magneto motoric force is provided by the solenoid 48. It is here required that the vane 43 be solid and electrically conductive in the radial direction. For the case the magnetic field strength is less than 2 T it is also desirable the vane be made from ferro magnetic material as would be the external flux return path. This would result in having to provide only few ampere turns since the non-magnetic liquid gaps are small. The liquid metal 44, which forms the liquid seal, also serves as the current transfer agent, transferring current radially between the vane 43 and the ring electrodes 41 and 42, respectively. Current is thus made to flow in the vane 43 in the radial direction between the said ring electrodes, in tune with the oscillatory motion of the vane. In the operation of the device as a motor or a pump, the vane is driven electrically by connecting the electrodes to an external source of alternating power. If the vane is driven internally by a pulsating fluid pressure, and the oscillator works as a generator, the generated alternating current will pass through an external electrical load.

The design according to FIG. 4 shows a high degree of design integration between electric and magnetic circuits, e.g., the current path indicated by arrow 50 largely passes through the same members as used for the magnetic circuit. This, of course, requires selective portions of the electric conductor to be ferro magnetic.

The vane axial dimension of single stage power oscillators is limited to permit the current to spread as uniformly as possible over the vane section. At high operating frequencies so-called skin currents must be avoided. Thus the vane axial dimension must be, at the very least, less than the current penetration depth. For this reason several stages may be required to handle high powers.

It is intended the power oscillator yielding or obtaining electric power in accordance with the electric grid, i.e. 60 Hz, 120 V in the U.S.A. and 50 Hz, 240 V most anywhere else. Since the previously described power oscillator is a single-turn device the potential difference over bussbar terminals is quite small. Thus, there is required a multiturn ratio transformer. The incorporation of this will be shown later herein. It goes without saying, should there be employed several internal electrical stages coupled in series, the transformer turn ratio would be relatively smaller, thus yielding a smaller transformer. It will also be evident that the ratio of swept volume to overall volume including flux return path and transformer drastically increases with employed number of stages. Thus, the power density increases with multistaging.

Figure 8:
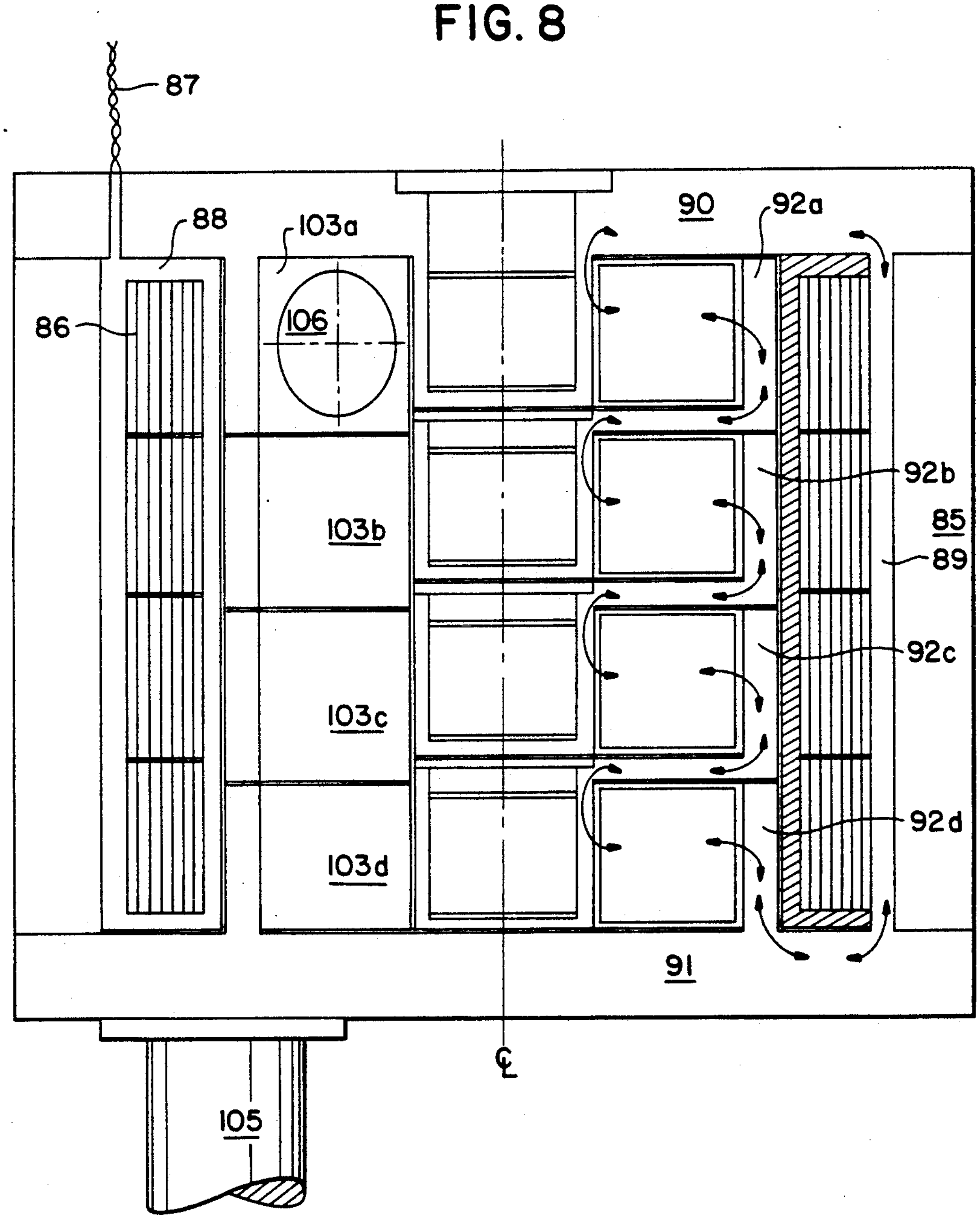
FIG. 8 is an illustration of a 4-stage power oscillator according to one embodiment of the invention.

FIG. 8 illustrates an embodiment of the invention, which is a 4-stage power oscillator. Each stage is similar to that illustrated in FIG. 4, with certain changes. Thus the magnetic and electric current circuits are still highly integrated, making use of essentially the same members. By way of example, the magnetic field winding 48 has been eliminated in favour of a permanent magnet ring 85, here providing the necessary magnetomotive force. The external electric circuit is here integrated within the device in the form of an inductively coupled transformer. Thus there is no need for high current busbars communicating with the outside. In the place occupied in FIG. 4 by the magnetic field winding 48 there is shown a toroidal field transformer with ferrite core 86, secondary windings 88 and low current/high voltage power leads 87. The single turn primary of the transformer is constituted by the current path through the ring element 89, a portion of the side covers 90 and 91 and essentially the outer ring electrodes **92*a* to 92*d***.

Whereas all the stages are electrically in series, the pressure fluid chambers of the respective stages are integrated, so that there are only two chambers on either side of the barriers **103*a* through 103*d*. This is made feasible by cutting away the cover, indicated at 49 in FIG. 4, between chambers above the maximum amplitude datum planes, indicated at EL-EL in FIG. 5. By way of example, a pipe 105 attaches a drilled hole through all the barriers 103*a* through 103*d*, communicating with one of the two pressure chambers via the port opening 106**.

The oscillator dynamics are naturally highly dependent on how the present oscillators are coupled with other oscillators or inertial masses, the nature of the pressure fluid and forcing functions, and mode of operation. Still the following analysis permits to identify the basic conditions for a system using displacement and power oscillators.

Figure 5:
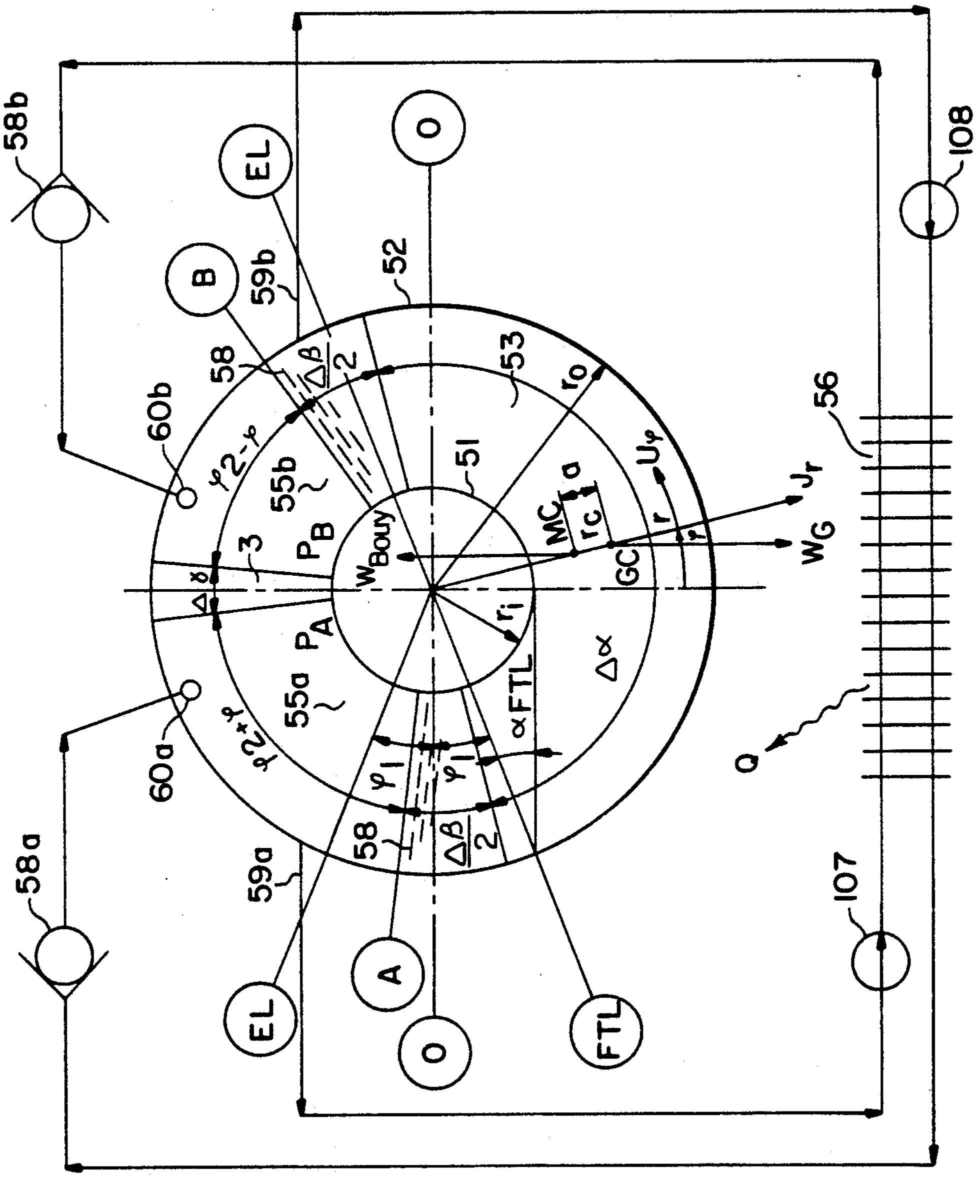
FIG. 5 is a schematic illustration of a device for carrying out essentially isothermal expension and/or compression cycles, comprising an oscillator according to the invention.

Referring to FIG. 5, the dynamics equation for an oscillator, be it a displacement oscillator or a power oscillator, can be written as:

$$J_{TOT}\ddot{\phi}+(A_{HA}+A_{GEN})\dot{\phi}+B_{BUOY}\phi+\Delta p r_m A=T(t) \quad (4)$$

Here $J_{TOT}$ includes the mass moment of inertia of all inertial masses deriving from the vane 13, the barrel axis 11, and the buffer liquid. The damping coefficient $A_{HA}$ is derived from liquid metal Hartmann flow in narrow gaps and reciprocating hydrodynamic flow theory, e.g., as previously shown with respect to Equations 2 and 3. The coefficient $B_{BUOY}$ derives from the gravitational and bouyancy restoring torques. For small angular displacements ($\phi \approx \sin\phi$):

$$B_{BUOY}=W_G r_c-W_B(r_c-a) \quad (5)$$

wherein $W_G$ is the gravitational force exerted by the mass of the vane and the buffer liquid acting at the gravitational center "GC", and $W_B$ is the bouyancy force deriving from the mass of the displaced liquid by the volume of the vane acting at the metacenter "MC". In order to prevent the vane from popping out of the liquid to one side when at rest it is required the submerged vane having a condition of static rotational equilibrium. This is satisfied for the quantity $B_{BUOY}$ being positive.

The fourth term in the dynamics equation is due to differential pressure restoring torque. For small amplitudes, the pressure difference $\Delta p=pB-pA$ becomes a linear function of the angular displacement $\phi$ and, generally speaking, also the displacement of another oscillator to which the present oscillator is coupled dynamically.

In the motor mode of an electric power oscillator the forcing function is identified as:

$$T(t)=0.5NB_z(r_o^2-r_i^2)I_o\cos\nu t, \quad (6)$$

where:
N=number of electrical stages (vanes)
$B_z$=axial magnetic field
$r_o$, $r_i$=outer and inner radii of annular cavity
$I_o$=current amplitude
$\nu$=forcing frequency In the generator mode of a power oscillator T(t)=0 while the damping coefficient $A_{GEN}$ applies. This is easily derived from the above expression for T(t) using homopolar machine theory.

In pneumatic and thermodynamic applications of the oscillators according to the invention gas compression and expansion can be made nearly isothermal. Referring to FIG. 2, sealing liquid is drained from the bottom of the annular cavity through an outlet 200, pumped by means of a pump, 201, through an external heat exchanger, 202, which may either subtract heat from the liquid or add heat to the liquid, according to cases, and is delivered to the respective pressure chambers via non-return valves 203 and liquid spray injection nozzles, 204.

FIG. 5 schematically shows in cross section an oscillator similar to that shown in FIG. 2 comprising a hub 51, an outer shell 52 and a vane 53. 58 indicates a buffer liquid. According to another embodiment of the invention, liquid, which in this case is indicated as being the buffer liquid, but could also be the sealing liquid, is pumped from chamber 55*a* to chamber 55*b*. The liquid is siphoned off above the maximum vane amplitude datum planes (viz. the EL planes), through drain pipes schematically indicated at 59*a* and 59*b* and is made to pass through an external heat exchanger 56, which may either subtract heat from the liquid or heat the liquid, according to cases, through non-return flow valves 58*a* and 58*b*, and is delivered to the opposite pressure chamber via liquid spray injection nozzles 60*a* and 60*b*. In this manner, for instance, all heat generated inside the device due to electromagnetic or mechanical losses may be taken off before the liquid is transferred to the chamber 55*b*, and vice versa, should the liquid be transferred from 55*b* to 55*a*. In other applications, if gas is being pumped through the device, for instance, in the expansion or compression phase of a thermodynamic cycle, heat may have to be subtracted from the compressed gas or heat may have to be added to the expanded gas and this is done in the same way by means of the aforesaid heat exchanger. Pumps 107 and 108 are provided for fluid pumping. In this way, the oscillator according to the invention is used as a heat exchanger and nearly isothermal compression or expansion of gases can be produced. Still with reference to the same figure, ports 60*a* and 60*b* are spray injection ports through which the liquid is injected into either chamber from the other chamber. In being so sprayed, the liquid will intimately mix with the gas that is being transferred through the device and/or subjected to expansion and/or compression, and which passes through the ports corresponding to ports 6*a* and 6*b* of FIG. 2 and not shown in this figure, and in this mixture of liquid spray with gas, heat will be exchanged from the liquid to the gas. Since the liquid has a much higher heat capacity than the gas, this latter will tend to acquire the temperature of the liquid of which there is required only a small volume relative to the gas. Isothermal conditions are thus very nearly achieved.

Figure 11:
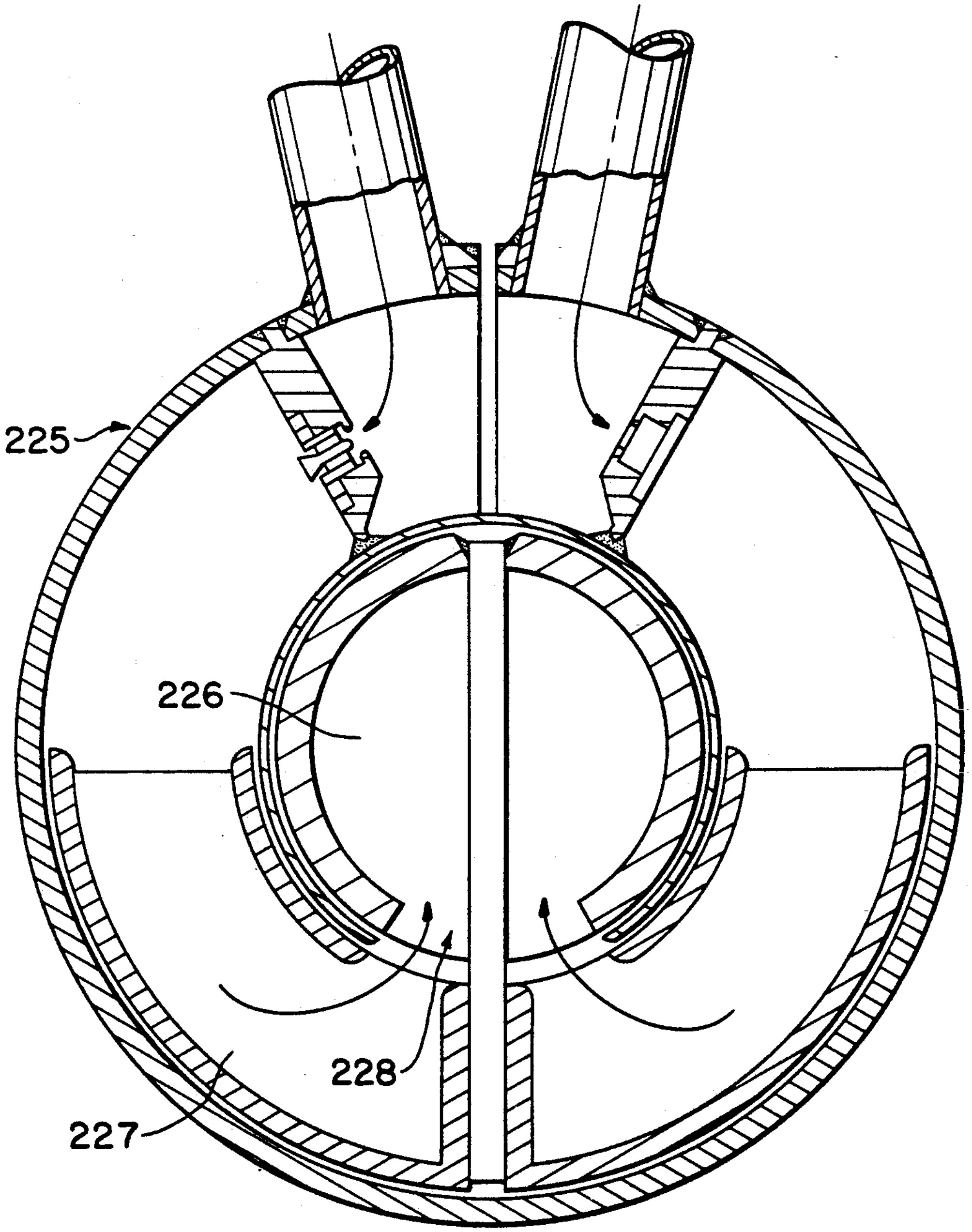
FIG. 11 illustrates the outflow of fluid through a hollow axis.

FIG. 11 shows a practical arrangement for fluid transport in a vane oscillator. The vane oscillator 225, according to this embodiment of the invention, is provided with a hollow axis 226 having at its extremity a discharge outlet (not shown). The axis has an opening on each side, to which corresponds an opening in the vane 227 which is of a channel type. Thus, when the two openings are one in front of the other, a passage 228 opens which permits fluid flow out of the vane oscillator through the central hollow axis.

Since the oscillators are double acting and subject to harmonic oscillations there is a cyclical pressure difference between the two pressure chambers. On the one hand, it could be destructive to the circulation pump and its transmission. On the other hand, it could also in principle be used for pumping liquid from one chamber to the other without the use of pumps, i.e. auto-pumping. The external heat transport circuit may be likened to a closed vertically oriented U-tube, partially filled with liquid, and with harmonically varying pressure difference between the two gas spaces $\Delta p=\Delta p_o\cos\nu t$. For this situation, the liquid motion can, using simplifying assumptions, be modelled by a second order ordinary differential equation with a sinosoidal forcing function. Thus, the motion has the classic solution:

$$Z=Z_o\cos(\nu t-\phi) \quad (7)$$

where the amplitude can be written:

$$Z_o=(\Delta P_o/2g)((1-(\nu/\omega)^2)^2+(2\epsilon\nu/\omega)^2)^{-\frac{1}{2}} \quad (8)$$

Above $\omega$ is the natural frequency, $\omega=(2\ g/L)^{178}$, where L is the length of the liquid column and g is the gravitational constant. In most instances for operation of the oscillators the natural frequency of the liquid heat transport circuit $\omega$ is quite small in comparison to the forcing frequency, $\nu$. Thus, the liquid amplitude would be small, according to Eq. 8, and the reesulting fluctuation in pressure head small. This bodes well for the useful life of the pump and its transmission, as well as insures steady liquid injection over the entire pressure cycle. Only for very small units, where the length of the liquid circuit is small and consequently, the natural frequency of the circuit approaches the forcing frequency, would there arise the possibility of achieving auto-pumping.

Another aspect of the invention is the provision of thermodynamic Stirling cycle devices utilizing oscillators according to the invention. As is well known, the quintessential thermodynamic Stirling cycle device is made up from a bi-directional regenerator surrounded on either side by compression and expansion spaces kept at steady differential temperatures relative to each other by means of a heater and a cooler. Acting on the expansion and compression spaces are reciprocating pistons. One of the pistons, usually the one operating nearby the environmental temperature, is used for power input-/output, according to operating cases. This is referred to as the power piston. The other piston is by definition a displacement piston. The pistons move in a harmonic motion with the same frequency, however, having a phase lag relative to each other. This is referred to as the alpha-configuration for Stirling cycle devices. Indeed, the present invention for Stirling cycle devices is of alpha-configuration, or variations thereof. The liquid sealed vane oscillators are introduced to take the place of the reciprocating pistons. Moreover, since they incorporate means for heat supply/rejection, via the method for direct contact heat-exchange described above, the heating and cooling functions are, in fact, built in to the oscillators themselves. Thus, separate heaters and coolers, called for by the prior art, are not employed.

There are made available options for piston drives effecting both kinematic and free-piston machines. The mechanical power oscillator, the one provided with shaft penetration, can be used with either drive method, whereas the electrical power oscillator is confined to use in free-piston devices.

In general, alpha-configured machines have the advantage of keeping the displacement and power oscillators apart with no direct conductance path to each other, thus, thermal conductance losses, afflicting the so-called beta and gamma configurations, are avoided. The alpha-configuration, when applied to free-piston devices, has the disadvantage that it may not be self-oscillatory with an operating frequency independent of load. Perhaps for this reason, other prior art free-piston Stirling cycle devices, credited to W. Beale, have been in the so-called beta-configuration.

Figure 10:
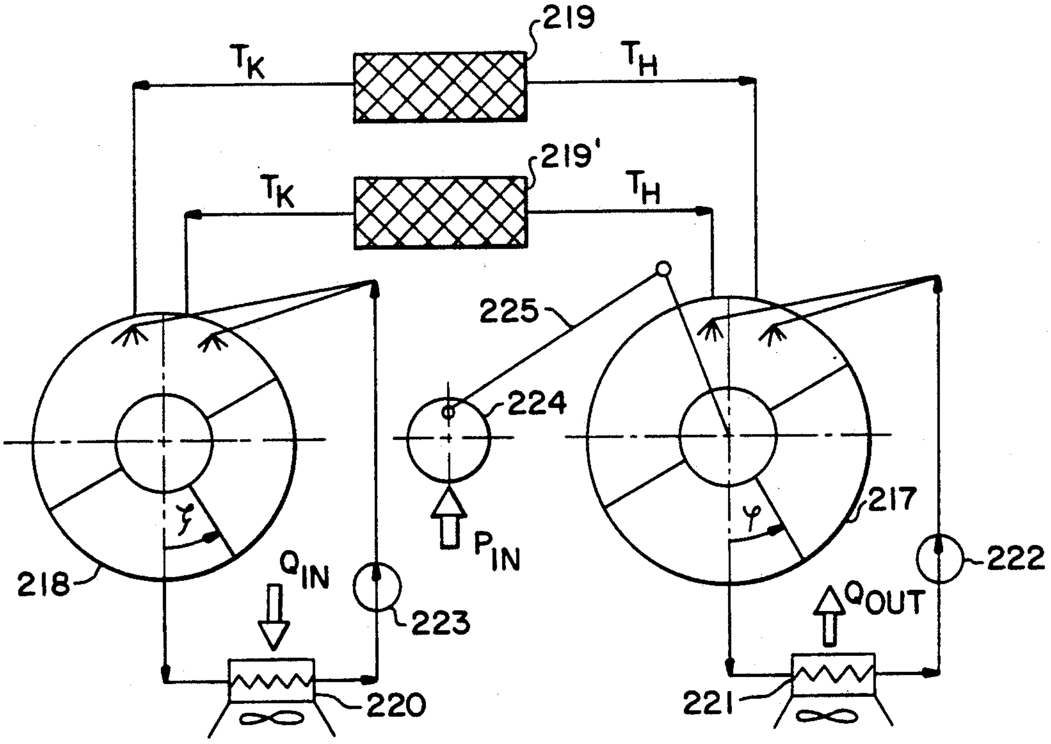
FIG. 10 is an illustration of a double-acting alpha-configuration refrigerator/heat pump.

In an electrically powered free-piston refrigerator/-heat-pump free oscillations are naturally not required. Therefore, the simple alpha-configuration is definitely preferred in this case. Better yet, in order to exploit the thermodynamic room to the fullest, considering the fact that the oscillators are double-acting, there is disclosed here a double-acting alpha-configuration using a set of two regenerators. This configuration is shown in FIG. 10, in which the power oscillator 217 and the displacement oscillator 218 are connected via bidirectional regenerators 219 and 219'. External heat-exchangers for heat absorption 220 and rejection 221 are provided. The heat transfer fluid is pumped by means of pumps 222 and 223. The power oscillator 217, of mechanical type, is connected to a drive motor 224 through a Grashof chain 225. The latter translates the constant speed axis rotation of the motor 224 to a harmonically varying rocking motion at the axis of the power oscillator 217. The displacement oscillator 218 is driven via the pulsating pressure communicated to it via the regenerators.

As a refrigerator/heat-pump the temperature TH is greater than the temperature TK. Should the device instead be operated as an engine, then TK>TH and, naturally, the motor 222 would be substituted for a generator. Since free oscillation, in this case, would have frequency dependency with load, kinetically linking the respective oscillators may be desirable to overcome this adverse feature. According to one approach, this would be effected by engaging the shafts of the oscillators via gear wheels (not shown in FIG. 10).

It has previously been mentioned that the simple alpha-configuration, in a free piston device, may have undesirable dynamic characteristics. The inventor has found, by performing dynamic analysis, that a free piston double-alpha configuration is positively self-oscillatory. It is characterized in that it comprises a power oscillator, the two pressure chambers of which are connected via regenerators to a pressure chamber of two displacement oscillators, the other pressure chamber of which is closed and becomes therefore a bouncing chamber. The regenerators are bidirectional regenerators. The said device can be used in different modes of operation, for instance:

A—Pure generator mode, with temperature conditions $T_{H1}>T_K$ and $T_{H2}>T_K$;

B—Cogeneration mode with refrigeration and electricity production, $T_{H1}>T_K>T_{H2}$;

C—Pure heat-pump or refrigeration mode, $T_K>T_{H1}$ and $T_K>T_{H2}$.

Figure 6:
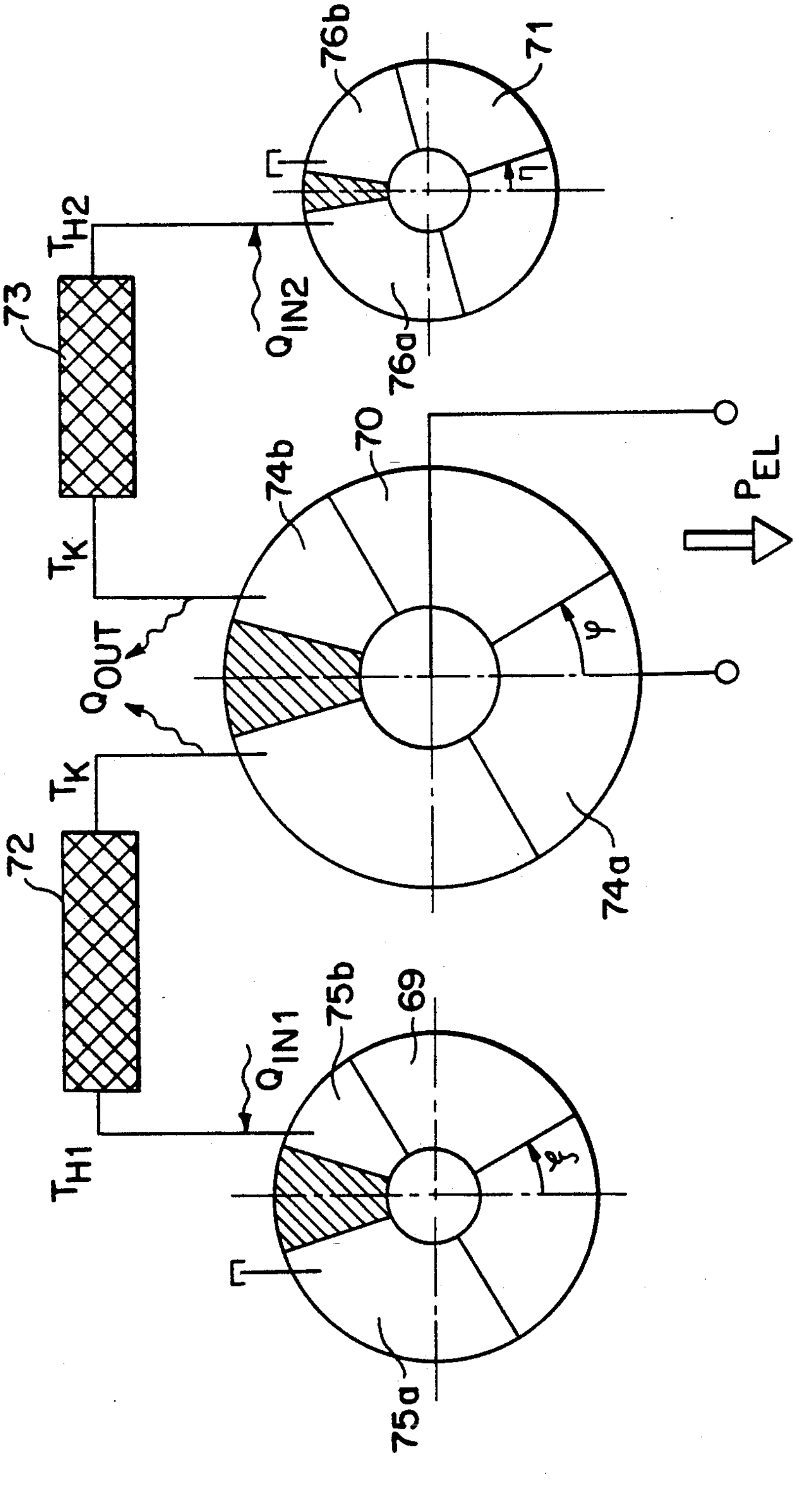
FIG. 6 is a schematic illustration of a free piston Stirling cycle engine according to one embodiment of the invention.

Referring to FIG. 6, the double-acting power oscillator 70 according to the present invention, or equivalent of the art, has its two pressure chambers linked to either side via two separate regenerators 72 and 73 to two separate displacement oscillators 71 and 69, according to the present invention, or equivalent of the art. Pressure chamber 74*a* of oscillator 70 is connected to pressure chamber 75*b* of oscillator 69, the other pressure chamber of which 75*a* is closed and becomes a bouncing chamber. Pressure chamber 74*b* of oscillator 70 is connected to pressure chamber 76*a* of oscillator 71, the other pressure chamber of which 76*b* is closed and becomes a bouncing chamber. To obtain free oscillations in this configuration it is essential that the dynamic characteristics of the respective displacement oscillators are essentially the same. Then the natural frequency can be written as $\omega=(a_1B_{BUOY}+a_2Po)^{\frac{1}{2}}$, where $B_{BUOY}$ has been defined before and Po is the charging pressure. Usually, the second term dominates, thus the natural frequency is proportional to the square root of the charging pressure. It is also realized that should the charging pressure be low a negative value for the quantity $B_{BUOY}$ could render the argument of the square root negative. Thus, the configuration would again not be self-oscillatory. This reinforces the aforementioned requirement for static rotational equilibrium.

In another embodiment of the invention, the said power oscillator 70 can be substituted by a displacement oscillator, the remaining parts of the device being the same. This embodiment can only operate in the refrigeration mode.

It is apparent that the double-alpha configuration is but a special case of a double acting oscillator arrangement, incorporating multiple oscillators in an open or closed chain. The chain concept has been proposed before by Herra Rinia of the Philips Research Laboratories in the Netherlands, however, as applying solely to kinematic machines using conventional double acting piston oscillators. The Rinia arrangement was to the knowledge of the inventor never applied to free piston devices and certainly not to devices using the present liquid sealed vane oscillators. The intrinsic value of the chain arrangement is that it enables heat supply and rejection with large differential temperatures even though expansion and compression processes be nearly isothermal. This facilitates matching the Stirling cycle, actually many cycles having different high and low temperatures, to the heat source/sink which are not isothermal in nature. There results smaller exergy losses in heat exchange to and from the cycles and pumping power expended in heat transport circuits is reduced. Furthermore, in case the chain is closed, there will be no need for so called bouncing spaces whose sole purpose is to provide gas springs in free piston devices. This, of course, increases the utilization of the thermodynamic room, and gas hysteresis losses associated with gas springs are positively removed.

Figure 9:
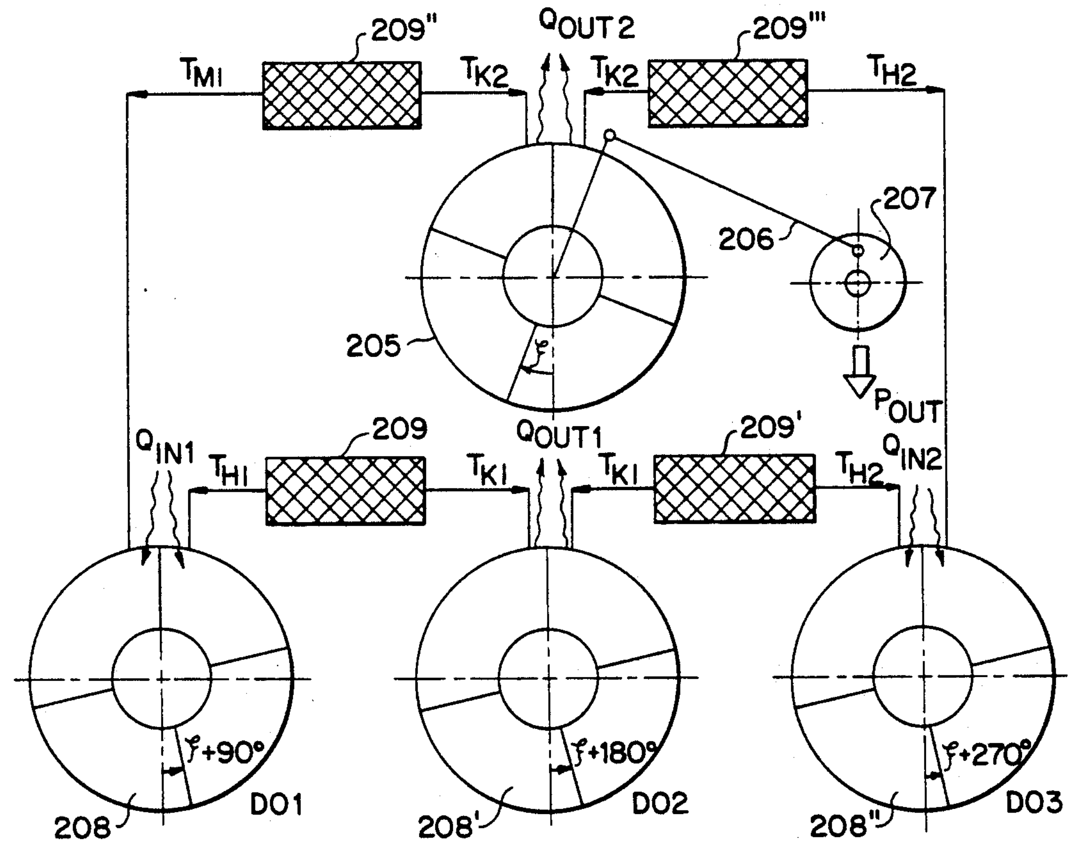
FIG. 9 is an illustration of a double-acting, double alpha Stirling engine.

FIG. 9 shows a double alpha arrangement with an additional set of one oscillator with surrounding regenerators (209—209''') put together to form a closed chain. The configuration is referred to here as a double acting double alpha configuration. In the engine mode of operation, heat is delivered to the two opposite lying displacement oscillators, 208 and 208'', which assume high temperatures TH1 and TH2, respectively, where TH1>TH2, as externally heated heat transfer fluid passes through the same in series and gives up its sensible heat. Heat is rejected from the engine from the oscillators 208' and 205 which assume temperatures $T_{K1}$ and $T_{K2}$, respectively, where $T_{K1}>T_{K2}$, as externally cooled heat transfer fluid passes through the same in series and absorbs sensible heat. At least one of the latter set of oscillators, e.g., oscillator 205, serves as a power oscillator. It is here indicated being of the version having a mechanical shaft whose harmonically varying rocking motion is translated to a constant speed generator 207 via a Grashof chain 206.

Using the double-alpha configuration for a thermally driven refrigerator/air-conditioner implies that all oscillators could be displacement oscillators performing integrated power and refrigeration cycles. Heat is supplied at the temperature $T_{H1}$, elevated above the heat rejection temperatures, $T_{K1}$ and $T_{K2}$. Heat is absorbed at a sub-environmental temperature $T_{H2}$. Assuming the heat source is a solar collector, it might be useful to shift to an electrically driven system at times when sun power is unavailable. It is then opportune to have one of the heat rejection oscillators operational in two alternative modes, i.e. normally as a displacement oscillator when the heat source is available, and as a power oscillator at other times. Thus, the indicated power oscillator 205 can suitably be clutched in and out, according to cases, relative to the drive motor. Observe, the generator 207 in FIG. 9 now serves as motor with electric power input.

In the above Stirling cycle devices expansion/compression processes, other than in the bouncing spaces, would, in accordance with the ideal thermodynamic Stirling cycle, be nearly isothermal. This is, however, not really the case in the prior state of the art Stirling cycle devices which, naturally, cannot use infinitely large internal heat-exchangers and where it is far more likely that the working spaces approach adiabatic conditions. With the introduction of the direct contact heat exchange feature associated with the present power and displacement oscillators, the working spaces, including the bouncing spaces, could presumably truly approach the ideal isothermal condition. This is not only important for producing, intrinsically speaking, high thermodynamic efficiency, it also minimizes the required temperature difference between the external heat source/sink relative to the actual temperature limits of the thermodynamic cycle. The latter implies that the temperature difference between heat source and heat sink can be relatively smaller for the attainment of a desired efficiency. Thus, solar power and waste heat, with relatively low elevated temperature above the environment, could possibly be exploited, where hitherto not considered practical or feasible, at not inconsiderable efficiencies, e.g., economic solar powered refrigeration has until now been considered an elusive goal.

Naturally, given a relatively large temperature difference between heat source and sink, the present Stirling cycle configurations could also use regular double-acting displacement and power pistons with internal heat-exchangers, in lieu of the present oscillators. However, they would probably not be as efficient also for the many other reasons pointed out earlier and, in addition, internal and external heat-exchangers could become quite space consuming.

Figure 7:
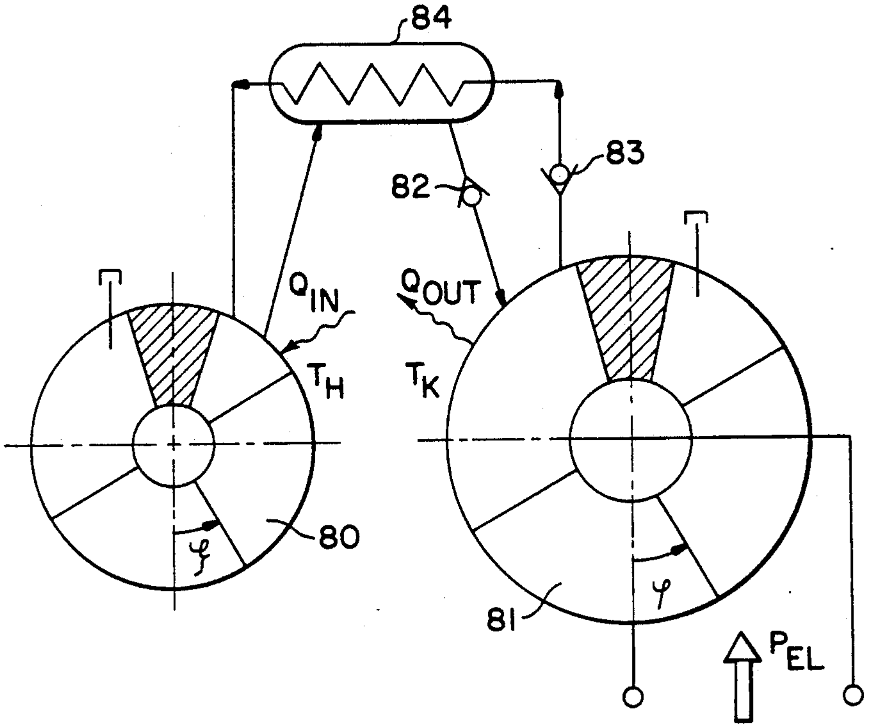
FIG. 7 is a schematic illustration of a free piston Ericsson cycle refrigerator/heat pump according to one embodiment of the invention.

In general, for a Stirling cycle refrigerator/heat pump to attain a coefficient-of-performance approaching the theoretical ideal it is, among other things, required that the pressure amplitude factor C (in $p=p_o(1+C\sin\nu t)$) be quite large, e.g. around 0.5 for a regenerator effectiveness already as high as 98% (a commonly claimed effectiveness). Although such high pressure amplitude factors may be obtained in practice, the linearized dynamic and thermodynamic models used for their analysis may be rendered invalid. On the other hand, Ericsson cycles are not as sensitive to pressure ratio as the regenerative heat exchanger effectiveness. The present invention, in another aspect thereof, illustrated in FIG. 7, provides an Ericsson cycle refrigerator/heat pump, which uses a displacement oscillator 80 and a power oscillator 81 in essentially an alpha-configuration. In this case, the oscillators are net fluid flow devices (as opposed to the previous Stirling cycle devices). Induction and delivery valves 82 and 83 respectively are attached to one pressure chamber of the power oscillator 81 (the other being a bouncing space) making it effectively a single-acting compressor. The induction and delivery gas lines relate to one pressure chamber of the displacement oscillator 80 (the other being a bouncing space) via a regenerative heat exchanger 84. This arrangement allows for isothermal compression at the cycle high temperature $T_K$ (above the environmental temperature) and constant high pressure delivery via the high temperature side of the regenerative heat exchanger and subsequent isothermal expansion at the cycle low temperature $T_H$ (below the temperature of the refrigerated object) and constant low pressure induction via the cold side of the regenerative heat-exchanger.

The displacement and power oscillators according to the invention may find applications in practically any area where use is made of double acting piston devices. In many instances they display a better performance than those of the prior art. This is so, since many of the common and/or difficult to quantify loss mechanisms are either entirely absent or better defined. Losses that may be peculiar to the oscillators of the invention, e.g. friction losses due to Hartmann flow, can be subject to adequate theoretical estimation. The use of liquid seals in lieu of gas dynamic seals implies the absence of seal leakage. In thermodynamic/pneumatic devices there are none of the so-called seal appendix losses, and using direct contact heat exchange near isothermal compression/expansion is achievable, leading to high isothermal efficiency. Negligible gas hysteresis losses in gas springs (in the bouncing spaces) might occur, and difficult to quantify gas friction losses in reciprocating flow past internal heat exchange surfaces would be absent. Unprecedented compactness and power density by volume can be achieved by the oscillators according to the invention. The use of lightweight ferromagnetic materials in the magnetic circuits permits to render also the power density by mass quite high. Further, the external liquid-to-liquid heat exchangers used in conjunction with direct contact heat exchange would be but a fraction of the size of corresponding gas-to-liquid heat exchangers employed in the prior art. This is important, since in thermodynamic/pneumatic applications external heat exchangers often determine the overall size of the machines. The hermetic close-out of the thermodynamic room facilitates the containment of low atomic weight, toxic, radioactive and flammable gases. Finally, the present devices place low demands on fine tolerances since the liquid gaps may be in the order of one millimeter.

Some preferred embodiments of the invention have been described, but it will be apparent that many variations and adaptations can be made therein and that the invention may be carried into practice in many ways, without departing from its spirit or exceeding the scope of the appended claims.

I claim:

1. A liquid sealed oscillator, comprising a stationary oscillation space, constituted by a sector of an annular cavity, having a rectangular cross-section in a plane through the axis of the cavity and vertically oriented plane of symmetry, which cavity contains a sealing liquid, two opposing pressure chambers on top of said oscillator, said chambers having parts communicating with the outside and a free-body vane of smaller included sector angle than the said oscillation cavity and having its surface in closely matching relationship with the inner facing wall of the said cavity, wherein the said vane is symmetrically oscillatable with the sealing liquid in the narrow gaps between the vane and the cavity walls providing a liquid dynamic seal across the vane relative to said two opposing pressure chambers.

2. An oscillator as in claim 1, wherein the part of the surface of the vane that is adjacent and moves in matching relationship with the wall of the oscillation cavity, is provided with serrations, preferably bidirectional, in order to enhance the liquid dynamic seal.

3. An oscillator as in claim 1, wherein the sealing liquid is electrically conductive and which comprises means for applying a magnetic field across said sealing liquid in the gaps between the vane and the inner wall of the vessel, whereby the said sealing liquid is held in place by Magneto Liquid Dynamic effect.

4. A liquid sealed oscillator, comprising an oscillation space, constituted by a sector of an annular cavity, having a rectangular cross-section in a plane through the axis of the cavity and vertically oriented plane of symmetry which cavity contains a sealing liquid, and a vane of smaller included sector angle than the said oscillation cavity and having is surface in closely matching relationship with the inner facing wall of the said cavity, wherein the said vane is symmetrically oscillatable with the said liquid in the narrow gaps between the vane and cavity walls providing a liquid dynamic seal and wherein the vane is fully submerged in the sealing liquid, however, the latter does not completely fill the oscillation cavity, thus, effectively leaving two separate, symmetrical pressure chambers above the free surface of the liquid, and the said pressure chambers containing pressure fluid, preferably inert gas.

5. An oscillator as in claim 1, having a buffer liquid interposed between the sealing liquid and the pressure fluid.

6. A liquid sealed oscillator, comprising an oscillation space, constituted by a sector of an annular cavity, having a rectangular cross-section in a plane through the axis of the cavity and vertically oriented plane of symmetry which cavity contains a sealing liquid, and a vane of smaller included sector angle than the said oscillation cavity and having is surface in closely matching relationship with the inner facing wall of the said cavity, wherein the said vane is symmetrically oscillatable with the said liquid in the narrow gaps between the vane and cavity walls providing a liquid dynamic seal and wherein the oscillating vane is provided with positive means for suspending it in the oscillator vessel.

7. A mechanical power oscillator as in claim 6 having shaft means for exchanging mechanical power with other driven or driving devices.

8. A power oscillator as in claim 1, comprising inner and outer rings acting as ring electrodes, sealing liquid and vane being electrically conductive, the lateral cavity walls wetted by the sealing liquid being electrically insulated relative to said liquid and to said ring electrodes and the pressure fluid being dielectric; and further comprising means for applying a steady magnetic field perpendicular across the radial extent of said vane, whereby when an alternating electric current from an external power source is applied to said electrodes said vane walls will be caused to oscillate, and when pressure pulsations are caused in the pressure fluid chambers and alternating current is generated which may be conducted through an external load linking said electrodes.

9. A power oscillator as in claim 8, wherein the internal armature conducting electric current, including the vane and electrodes, are made from ferromagnetic material and there is provided an external flux return path, also of ferromagnetic material, all of which elements form a magnetic circuit having only small non-ferromagnetic gaps coinciding with the lateral liquid gaps, arising between the vane and lateral sidewalls.

10. A power oscillator as in claim 8, wherein there is integrated an electric transformer in which the internal armature conducting electric current between the electrodes forms a single turn primary of said transformer, the linked flux of which is toroidally oriented.

11. A multi-stage power oscillator, comprising a number of oscillator stages as in claim 8, all the stages being electrically in series and the pressure chambers of the respective stages being integrated.

12. A liquid sealed oscillator device for carrying out essentially isothermal expansion and/or compression processes comprising an oscillator, said oscillator having pressure chambers and having an oscillator cavity containing a liquid, a heat exchanger, and means for transferring buffer or sealing liquid, such liquid becoming heat transfer liquid, from said liquid contained in the oscillator cavity to the respective pressure chambers of the said oscillator via said heat exchanger, and means for atomizing said liquid within the chamber to which it is transferred and creating an intimate mixture of said liquid with the pressure fluid handled by the oscillator.

13. An oscillator device according to claim 12, wherein said oscillator device has a double-sided vane and a hollow double-sided vane axis and in which the heat transfer liquid drains into two local and opposite channels provided in said vane, then passes through openings, having matching location and size relationships to said channels in said central double-sided hollow axis, then exits the oscillator in the axial direction through said axis, at whose end the two liquid streams merge; and a circulation pump, said pump providing sufficient head to overcome flow resistance in the downstream external heat exchanger, the injection plenae and associated spray nozzles.

14. A thermodynamic Stirling cycle device, comprising a double-acting liquid sealed power oscillator having two pressure chambers, said two pressure chambers being connected via bidirectional regenerators to the respective pressure chambers of a double-acting displacement oscillator.

15. A thermodynamic free piston Stirling cycle machine, comprising a liquid sealed power oscillator having two pressure chambers, said two pressure chambers being connected via bidirectional regenerators to a pressure chamber of two displacement oscillators, the other pressure chamber of which is closed and becomes therefore a bouncing chamber.

16. A thermodynamic free piston Stirling cycle machine comprising a liquid sealed power oscillator having two pressure chambers, said two pressure chambers being connected via bidirectional regenerators to a pressure chamber of two displacement oscillators, the other pressure chamber of which is closed and becomes therefore a bouncing chamber, and wherein it comprises a double-acting power oscillator as in claim 1, interfacing, with its pressure chambers, two independent bidirectional regenerators, which communicate with double-acting displacement oscillators, each having bouncing spaces in its pressure chambers, the combination of the aforesaid elements forming the equivalent of a self-oscillatory three-mass-four-spring system, the dynamic characteristics of the alpha-configured legs being substantially the same, and means being further provided for supplying heat to the fluid in the expansion spaces of the displacement oscillators and for withdrawing heat from the fluid in the compression spaces surrounding the power oscillator.

17. A free piston Stirling cycle refrigerator, comprising a liquid sealed power oscillator having two pressure chambers, said two pressure chambers being connected via bidirectional regenerators to a pressure chamber of two displacement oscillators, the other pressure chamber of which is closed and becomes therefore a bouncing chamber, wherein the central power oscillator is replaced by a displacement oscillator according to claim 1, whereby a three displacement oscillator is produced, capable of being thermally driven as a refrigerator.

18. A thermodynamic Stirling cycle device, comprising four double-acting vane liquid sealed oscillators, whose pressure chambers are inter-connected via bidirectional regenerators forming a closed chain.

19. A thermally driven Stirling cycle refrigerator arranged as in claim 18, wherein two opposite-lying liquid sealed oscillators reject heat to the environment and the other set of two oscillators absorb heat at super- and sub-environmental temperatures, respectively, and the combination of the aforesaid features and elements form a self-oscillatory system performing integrated power and refrigeration cycles.

20. A Stirling cycle engine, as in the arrangement in claim 18, in which two opposite-lying oscillators, at least one of them a liquid sealed power oscillator, reject heat to the environment by passing heat transfer liquid through the said oscillators in series and then through an external reject heat exchanger, and in which the other set of two oscillators are strictly of displacement type and absorb heat at elevated temperatures by passing heat transfer liquid through the said oscillators in series and then through an external supply heat exchanger, and the combination of these elements and features form a self-oscillatory system performing integrated power cycles.

21. A free piston Ericsson cycle refrigerator/heat pump, comprising a liquid sealed displacement and a liquid sealed power oscillator in essentially an alpha-configuration, said oscillators being net fluid flow devices, one pressure chamber of the power oscillator being a bouncing space and the other pressure chamber thereof being connected via a regenerative heat exchanger to one pressure chamber of the displacement oscillator, the other chamber thereof being a bouncing space.

22. A mechanical power oscillator according to claim 6, where the axis penetrates to the outside and attached to a 4-bar linkage of the Grashof chain type, suspended and referenced to the outside of the oscillator housing, thereby affecting a controlled amplitude harmonic vane motion dictated by the said linkage.

* * * * *